(12) United States Patent
Ott

(10) Patent No.: US 11,326,674 B2
(45) Date of Patent: May 10, 2022

(54) SPINDLE NUT, THREADED DRIVE, AND METHOD FOR MANUFACTURING A SPINDLE NUT

(71) Applicant: Schaeffler Technologies AG & Co. KG, Herzogenaurach (DE)

(72) Inventor: Philippe Ott, Uttenhoffen (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/095,739

(22) PCT Filed: Apr. 28, 2017

(86) PCT No.: PCT/DE2017/100351
§ 371 (c)(1),
(2) Date: Oct. 23, 2018

(87) PCT Pub. No.: WO2017/202412
PCT Pub. Date: Nov. 30, 2017

(65) Prior Publication Data
US 2019/0170230 A1    Jun. 6, 2019

(30) Foreign Application Priority Data

May 25, 2016  (DE) .......................... 102016209119.0

(51) Int. Cl.
*B21D 53/24*    (2006.01)
*F16H 25/22*    (2006.01)
(Continued)

(52) U.S. Cl.
CPC .......... *F16H 25/2204* (2013.01); *B21D 53/24* (2013.01); *F16H 25/22* (2013.01);
(Continued)

(58) Field of Classification Search
CPC ... B21H 3/08; B23G 7/00; B23G 7/02; B21D 53/24; F16H 25/2204; F16H 2025/2242;
(Continued)

(56) References Cited

U.S. PATENT DOCUMENTS

| | | | | |
|---|---|---|---|---|
| 949,897 | A | * | 2/1910 | Higgin .................... F16B 37/14 411/430 |
| 1,676,482 | A | * | 7/1928 | De Lapotterie .......... B23G 1/18 470/84 |

(Continued)

FOREIGN PATENT DOCUMENTS

| CN | 101248300 A | 8/2008 |
|---|---|---|
| CN | 105408641 A | 3/2016 |

(Continued)

OTHER PUBLICATIONS

Translation; SKF; FR 2149859 A5; Mar. 1973.*
Translation, DE 102013207406 A1; Gruss; Jul. 10, 2014.*
Translation, DE 102009049194 A1; Wilken et al.; Jun. 16, 2011.*

*Primary Examiner* — Edward T Tolan

(57) ABSTRACT

Methods for producing a spindle nut, and spindle nuts produced by such methods are disclosed. The method for producing a spindle nut may include producing a blank which has a sleeve portion and a cylindrical outer surface by non-cutting shaping from sheet metal; and forming a thread provided for cooperation with a threaded spindle in the blank by non-cutting shaping, while maintaining the cylindrical outer surface of the sleeve portion.

8 Claims, 2 Drawing Sheets

(51) Int. Cl.
  *F16H 25/24* (2006.01)
  *B21H 3/08* (2006.01)
(52) U.S. Cl.
  CPC ............... *F16H 25/24* (2013.01); *B21H 3/08* (2013.01); *F16H 2025/2481* (2013.01)
(58) Field of Classification Search
  CPC .. F16H 25/24; F16H 2025/2481; F16H 25/22; F16H 25/2219; F16H 2025/2028; B21K 1/04; B21K 1/70
  See application file for complete search history.

(56) References Cited

U.S. PATENT DOCUMENTS

| | | | | |
|---|---|---|---|---|
| 2,026,859 | A * | 1/1936 | Baynes | B21D 53/24 411/427 |
| 2,240,425 | A * | 4/1941 | Sternbergh | F16B 19/004 411/433 |
| 2,609,596 | A * | 9/1952 | Clark | B21D 53/24 72/339 |
| 2,715,925 | A | 8/1955 | Morgan | |
| 3,006,003 | A * | 10/1961 | Johnson, Jr. | B21K 1/56 470/25 |
| 3,010,126 | A * | 11/1961 | Willcox | B21K 1/56 470/84 |
| 3,214,993 | A * | 11/1965 | Teramachi | F16H 25/2233 74/424.9 |
| 3,261,224 | A * | 7/1966 | Anthony | F16H 25/2223 74/424.86 |
| 3,513,684 | A * | 5/1970 | Price | B21K 1/64 72/340 |
| 3,748,674 | A * | 7/1973 | Powell | B21D 53/24 470/18 |
| 3,877,341 | A * | 4/1975 | Grimm | F16B 37/043 411/437 |
| 3,902,377 | A * | 9/1975 | Lemor | F16H 25/2219 74/424.86 |
| 4,074,587 | A * | 2/1978 | Brusasco | F16H 25/2427 74/424.82 |
| 4,080,011 | A * | 3/1978 | Wilke | F16H 25/2204 384/45 |
| 4,416,142 | A * | 11/1983 | Thorne-Thomsen | B21D 51/50 470/84 |
| 4,685,345 | A * | 8/1987 | Gruss | B66F 3/12 74/25 |
| 5,358,265 | A * | 10/1994 | Yaple | B62H 1/02 280/293 |
| 5,492,030 | A * | 2/1996 | Benton | F16H 25/2209 74/424.82 |
| 5,863,164 | A * | 1/1999 | Leistner | F16B 37/048 411/177 |
| 6,116,109 | A * | 9/2000 | Zernickel | F16H 25/2214 74/424.9 |
| 6,192,585 | B1 * | 2/2001 | Buchanan, Jr. | B21D 53/24 29/898.06 |
| 6,334,370 | B1 * | 1/2002 | Sonoda | B21H 3/08 29/898.03 |
| 7,013,747 | B2 * | 3/2006 | Drake | F16H 25/2214 74/424.83 |
| 7,536,928 | B2 * | 5/2009 | Kazuno | F16H 25/2204 74/424.75 |
| 8,262,492 | B2 * | 9/2012 | Kadono | B21K 1/14 470/18 |
| 8,950,282 | B2 * | 2/2015 | Babinski | B23P 15/00 74/424.82 |
| 8,950,283 | B2 * | 2/2015 | Watanabe | B21K 21/12 74/424.86 |
| 10,486,273 | B2 * | 11/2019 | Faber | B23P 15/003 |
| 2010/0101348 | A1 * | 4/2010 | Teramachi | F16H 25/2223 74/424.81 |
| 2014/0326090 | A1 * | 11/2014 | Kisa | B21D 53/10 74/89.23 |
| 2016/0010678 | A1 * | 1/2016 | Ortega Dona | B21K 1/64 411/432 |
| 2016/0138638 | A1 * | 5/2016 | Lukic | F16B 33/02 411/428 |

FOREIGN PATENT DOCUMENTS

| | | | | |
|---|---|---|---|---|
| DE | 2240077 | A1 | 3/1973 | |
| DE | 2829433 | A1 | 1/1979 | |
| DE | 19652181 | A1 | 6/1998 | |
| DE | 19953287 | A1 | 5/2001 | |
| DE | 10028968 | A1 | 12/2001 | |
| DE | 102009049194 | A1 * | 6/2011 | ............ F16H 25/24 |
| DE | 102013207406 | A1 * | 7/2014 | ............ B21D 53/24 |
| DE | 102013207618 | A1 | 10/2014 | |
| EP | 1914447 | A1 | 4/2008 | |
| FR | 2149859 | A5 * | 3/1973 | ..... F16H 2025/2481 |
| FR | 2191676 | A5 | 2/1974 | |
| JP | H09300043 | A | 11/1997 | |
| JP | 2002257208 | A | 9/2002 | |
| JP | 2011088190 | A | 5/2011 | |
| JP | 2013166173 | A | 8/2013 | |
| KR | 20120034599 | A | 4/2012 | |

* cited by examiner

SPINDLE NUT, THREADED DRIVE, AND METHOD FOR MANUFACTURING A SPINDLE NUT

CROSS-REFERENCE TO RELATED APPLICATIONS

This application is the U.S. National Phase of PCT Appln. No. PCT/DE2017/100351 filed Apr. 28, 2017, which claims priority to DE 10 2016 209 119.0 filed May 25, 2016, the entire disclosures of which are incorporated by reference herein.

TECHNICAL FIELD

The disclosure relates to a spindle nut, a method for producing a spindle nut, and a screw drive having a spindle nut.

BACKGROUND

A spindle nut and an associated ball screw drive is known for example from DE 10 2013 207 618 A1. The ball screw drive has a ball bearing as a support bearing.

Components of a screw drive, also known as a screw gear, can essentially be machined in a cutting or non-cutting process. The use of sheet metal parts for screw drives is known in principle from DE 28 29 433 C2 and from DE 100 28 968 A1. In both cases, the contours of threads which are formed on the inner face of the respective spindle nut are also visible on the outer face thereof. This means that the spindle nut is formed from sheet metal with a uniform wall thickness.

SUMMARY

The disclosure is based on the object of realizing the production of a spindle nut and a screw drive working therewith in a particularly efficient manner, whilst achieving good functionality.

This object may be achieved according to the disclosure by a spindle nut, by a method for producing a spindle nut and by a screw drive, which comprises a spindle nut according to the disclosure. Embodiments and advantages of the disclosure which are explained below in conjunction with the devices, i.e. the spindle nut and the screw drive, also apply analogously to the production method and vice versa.

The spindle nut may be designed as a shaped metal part, in particular a sheet metal part, wherein a cylindrical region of the spindle nut is referred to as a sleeve portion. A thread, which cooperates with a threaded spindle either directly or with the interposition of rolling bodies, is formed on the inner face of this sleeve portion. In contrast to the inner face of the of the sleeve portion, which is contoured in the shape of the thread, the outer surface of the sleeve portion is smooth and cylindrical.

The spindle nut can be produced in the following steps from a metal starting material, in particular from sheet metal, which is present for example in strip form:

a blank having a sleeve portion and a cylindrical outer surface is produced by non-cutting shaping, such as by deep drawing from sheet metal, wherein the dimensions of the cylindrical outer surface correspond to the external dimensions of the subsequent threaded spindle;
   by non-cutting shaping, such as thread grooving, the thread provided for cooperation with a threaded spindle is formed in the blank whilst the cylindrical outer surface of the sleeve portion remains unchanged.

As an alternative to deep drawing, the production of the blank can, in principle, also take place by extrusion, wherein parts having walls which are less thin can preferably be generated by this likewise non-cutting method. In each case, the mean wall thickness of the sleeve portion of the finished spindle nut preferably corresponds to the wall thickness of the sleeve portion of the blank.

A metal material with a strength of up to 1,200 N/mm$^2$ and a fracture strain of at least 8% is preferably selected as the material for producing the spindle nut.

The disclosure starts with the consideration that diverse advantages can be achieved by the non-cutting production of a thread: The principle involved means that chips do not accumulate during manufacture; at the same time, a good surface quality can be achieved, wherein shaping the material results in strength benefits over manufacturing methods which involve cutting.

However, the disadvantages of shaping methods are the relatively high machining forces and moments when compared to cutting methods. Therefore, in the prior art, the generation of internal threads by thread forming, in particular thread grooving, can only be considered for solid components. A spindle nut which is manufactured from sheet metal is obviously not such a component.

It has surprisingly been shown that forming the thread in the spindle nut is reliably possible in spite of its thin-walled design. Sheet metal, which can be provided for example as a strip, is preferably used as a starting product for producing the sleeve-shaped blank when the spindle nut is produced by deep drawing. If the sleeve-shaped blank is produced by extrusion, a solid material, in particular wire, will be the starting point from which the blank is formed.

After the sleeve shape of the blank has been produced by non-cutting shaping, namely deep drawing or extrusion, the thread, in particular in the form of a ball track, is formed on the inner face of the blank by a suitable tool, in particular a thread groover. This shaping takes place by material displacement within the wall of the sleeve-shaped blank. In this case, the outer contour of the sleeve-shaped blank is preferably held by a die so that material of the sleeve-shaped blank cannot be displaced outwards. Instead, the material is displaced exclusively into clearances which are formed between surface portions of the tool and the inner surface of the sleeve-shaped blank. A defined shoulder height of the thread can thus be generated by grooving. The thread can likewise be incorporated in the inner face of the spindle nut by thread-forming screws. A combination of different forms of the method for producing the thread in the sleeve-shaped blank, which undergoes further processing to produce a spindle nut, is considered. Instead of a single-start thread, a multi-start thread can also be formed in the spindle nut. The at least one thread can have for example a rounded contour or a trapezoidal contour, wherein the trapezoidal contour is selected in particular in the case of a simple movement thread without rolling bodies.

In one embodiment, the mean depth of the at least one thread corresponds to at least 20% and at most 50% of the mean wall thickness of the sleeve portion of the spindle nut. The said mean wall thickness is preferably less than a quarter of the radius of the sleeve portion. At the same time, the mean wall thickness of the sleeve portion preferably corresponds to more than a tenth of the radius of the sleeve portion.

According to another embodiment, a radially outwardly directed flange adjoins an end face of the sleeve portion in one piece. The flange is useful, for example, for fastening the spindle nut in or on a surrounding component and can have bores for this purpose, which can likewise be produced without cutting. A precise outer contour of the flange can likewise be produced by punching. Contours of the spindle nut can moreover be produced by stamping, for example.

Instead of a flange, the sleeve portion can also have a radially inwardly directed rim. Embodiments of the spindle nut in which the sleeve portion merges into a flange at one end face and into a rim at the opposite end face can likewise be realized.

In all cases, the spindle nut as a whole, including the thread and possibly the flange and/or the rim, may be produced in one piece from sheet metal, in particular sheet steel, by shaping methods.

Irrespective of the geometric design of the single thread or multiple threads of the spindle nut, the wall thickness of the flange integrally formed on the sleeve-shaped blank preferably deviates from the mean wall thickness of the sleeve portion by no more than 15%. In particular, the wall thickness of the flange can correspond to the mean wall thickness of the sleeve portion. The corresponding relationships apply to the wall thickness of the inwardly directed rim compared to the cylindrical sleeve portion, contoured by the thread, of the spindle nut.

In principle, the forming of the flange, the forming of the rim and the forming of the thread is possible in any sequence. In an advantageous process, a sleeve-shaped part is firstly formed from a starting part, in particular a portion of a sheet metal strip or a portion of a wire, which sleeve-shaped part has all the outer contours of the spindle nut, including the flange and the rim, but does not yet have a thread.

The rim which is optionally integrally formed on the sleeve portion is particularly suitable for forming a contact surface for an annular intermediate piece which supports the threaded spindle with respect to the spindle nut in the radial direction of the screw drive. The intermediate piece is preferably formed in such a way that, with regard to the axial direction of the threaded spindle and the spindle nut and therefore the screw drive as a whole, it is held with form fit in the thread of the spindle nut. Moreover, the intermediate piece can serve to prevent rolling bodies, in particular balls, from falling out of the screw drive. This applies in particular in cases in which the screw drive is designed as a non-returning ball screw drive.

A non-returning ball screw drive refers to a ball screw drive which does not have a ball return in the spindle nut. Accordingly, in this embodiment, the sleeve portion of the spindle nut has a closed surface. The closed outer surface of the sleeve portion is designed such that it is preferably completely cylindrical, i.e. without groove structures corresponding to the thread. A die, into which the sleeve-shaped blank is inserted during the production method to enable the thread to be formed, accordingly likewise has a smooth cylindrical surface.

As an alternative to a non-returning ball guide, the ball screw drive can be designed for example with an external recirculation system or with single recirculation systems. In the latter case, balls roll only one turn in the thread to then be returned to the same turn. To this end, a plurality of return elements are inserted in cutouts in the wall of the spindle nut, which cutouts can be generated for example by punching. The punching preferably takes place in the soft, i.e. not yet hardened, state of the spindle nut. Cutouts, in which the recirculation pieces can be inserted, can likewise be generated in the hardened spindle nut by drilling. The outer surface of the spindle nut is moreover continuously smooth in these cases and free of openings.

As with the spindle nut of the screw drive, the threaded spindle of this latter can also be produced by a shaping, i.e. non-cutting method. Possible methods for this are those in which a tool rolls along the outer surface of a shaft from which the threaded spindle is formed. In this case, a rotation of the threaded spindle, the tool or both parts can take place. The threaded spindle is either a solid or a tubular part.

In particular in cases in which the spindle nut cooperates directly with the threaded spindle, i.e. without rolling bodies, one of the two said parts can be provided with a friction-reducing coating or be manufactured as a whole from a material which is favorable in terms of the friction properties, for example nonferrous metal.

During operation of the screw drive, either the spindle nut or the threaded spindle can function as a rotating part, whilst the other part in each case is moved exclusively linearly. If rolling bodies, in particular balls, roll along the screw drive between the spindle nut and the threaded spindle, but a rolling body return is not provided, the screw drive is suitable in particular for operating devices with a small operating displacement. For example, this includes operating devices in a device for exhaust gas recirculation in an internal combustion engine.

To achieve or improve the suitability of the thread as a ball track, the spindle nut can be subjected to a heat treatment. After the heat treatment, the spindle nut as a whole can be overmolded with plastics material, wherein the plastics overmolding has for example a toothed structure which enables the spindle nut to be driven by a toothed belt. Embodiments of the screw drive in which the spindle nut is driven by an electric motor directly, i.e. without a gear mechanism, can likewise be realized.

BRIEF DESCRIPTION OF THE DRAWINGS

An exemplary embodiment of the disclosure is explained in more detail below with reference to a drawing, which shows.

DETAILED DESCRIPTION

Figure 1:
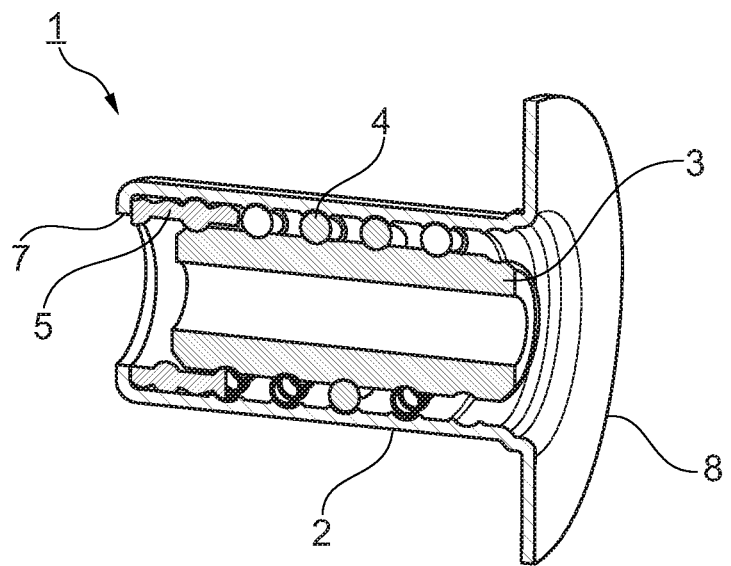
FIG. 1 a screw drive in a sectional perspective view.

FIG. 1 shows a screw drive 1, namely a ball screw drive, which comprises a spindle nut 2 and a threaded spindle 3. The spindle nut 2 is a single-piece sheet metal part made from sheet steel; the threaded spindle 3 is a steel tube. Balls serving as rolling bodies 4 roll between the threaded spindle 3 and the spindle nut 2. An annular intermediate piece 5, whereof the cross-section is adapted to the contours of the spindle nut 2 and the threaded spindle 3, is furthermore located between the threaded spindle 3 and the spindle nut 2. The intermediate piece 5, which also serves to support a spring, strikes a radially inwardly directed rim 7, which delimits a cylindrical sleeve portion (denoted by 6) of the spindle nut 2 at an end face.

At the opposite end face of the sleeve portion 6, this merges into a radially outwardly directed flange 8. The flange 8 can be provided with fastening bores in a manner which is not shown.

Figure 2:
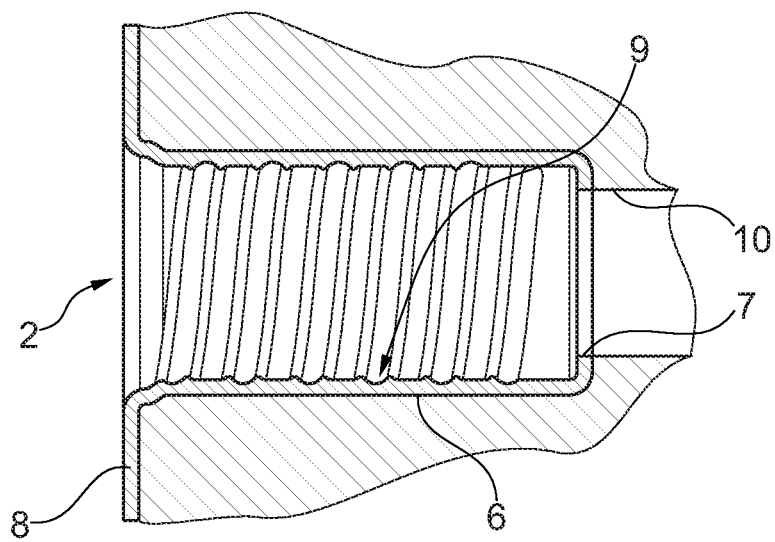
FIG. 2 a spindle nut of the screw drive according to FIG. 1 during the production process.

The production of the spindle nut 2 is explained below with reference to FIG. 2: a blank, which is produced by deep drawing from sheet metal and whereof the outer contour already corresponds to the outer contour of the spindle nut 2 but is still smooth on the inner face, is inserted into a die 10 so that the cylindrical outer wall of the sleeve portion 6 lies with its entire surface against the inner wall of the die 10. The flange 8 and the rim 7 likewise lie against the die 10. With the aid of a tool (not illustrated), the thread denoted by 9 is generated in the sleeve portion 6 of the spindle nut 2.

The spindle nut 2 as a whole is then subjected to a heat treatment, in particular to improve the suitability of the thread 9 as a rolling-body track. In this hardened state, the spindle nut 2 can be used without further machining steps for assembly of the screw drive 1. Alternatively, in a manner not shown, the cylindrical outer surface of the sleeve portion 6 can be overmolded with a plastics sheathing, whereof the outer surface is designed as a toothed contour to enable the spindle nut 2 to be driven by a toothed wheel or a toothed belt.

Like the spindle nut 2, the threaded spindle 3 can also be produced by a shaping method. To this end, the threaded spindle 3 is placed on a mandrel (not illustrated) and then machined by a tool which acts on the outer surface of the threaded spindle 3.

The screw drive 1 is a ball screw drive without a ball return. To prevent rolling bodies 4 from falling out of the screw drive 1, an annular end piece (not illustrated) can be arranged on that side of the spindle nut 2 on which the flange 8 is located, analogously to the intermediate piece 5. Instead of a rotation of the spindle nut 2, a rotation of the threaded spindle 3 can also be provided during operation of the screw drive 1, wherein, in this case, the displaceable spindle nut 2 is secured against rotation in a manner which is not illustrated.

Figure 3:
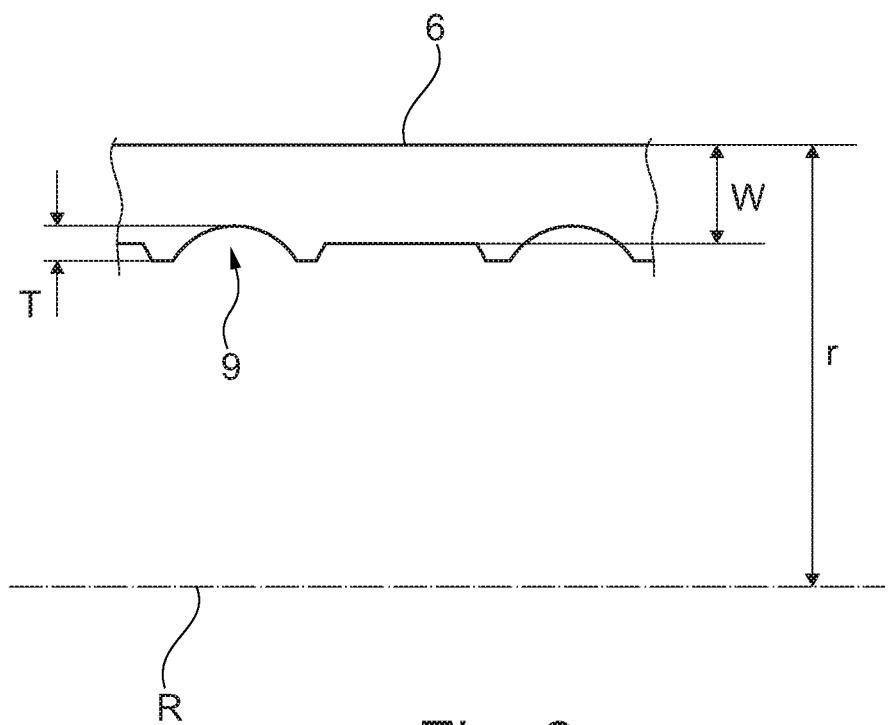
FIG. 3 a detail of the spindle nut in a schematic sectional illustration.

FIG. 3 serves to illustrate dimension ratios of the spindle nut 2. The radius of the sleeve portion 6 is denoted by r. R denotes the axis of symmetry of the spindle nut 2, which is identical to the axis of rotation of the screw drive 1. The sleeve portion 6 has a mean wall thickness W which is less than 25% of the radius r. The depth (denoted by T) of the thread 9 corresponds to more than 20% but less than 50% of the mean wall thickness W of the sleeve portion 6 of the spindle nut 2.

LIST OF REFERENCE SIGNS

1 Screw drive, ball screw drive
2 Spindle nut
3 Threaded spindle
4 Rolling body, ball
5 Intermediate piece
6 Sleeve portion
7 Rim
8 Flange
9 Thread
10 Die
r Radius of the spindle nut
R Axis of rotation
T Depth of the thread
W Mean wall thickness

The invention claimed is:

1. A method for producing a spindle nut, the method comprising:
    producing a blank which has a sleeve portion and a cylindrical outer surface by non-cutting shaping from sheet metal wherein, a radially outwardly pointing flange is integrally formed on one end face of the blank and a radially inwardly directed rim is integrally formed on the opposite end face;
    forming a thread provided for cooperation with a threaded spindle in the blank by non-cutting shaping, while maintaining the cylindrical outer surface of the sleeve portion.

2. The method as claimed in claim 1, wherein the sleeve portion is formed by deep drawing or extrusion and the thread is formed by thread grooving.

3. The method as claimed in claim 1, wherein a wall thickness of the flange and a wall thickness of the rim deviates from a mean wall thickness (W) of the sleeve portion by no more than 15%.

4. A spindle nut, comprising a sleeve portion with a cylindrical outer surface and a threaded inner surface, a radially outwardly pointing flange integrally formed on a first end face of the sleeve portion, and a radially inwardly directed rim integrally formed on a second end face of the sleeve portion opposite the first end face, wherein a depth of threads of the threaded inner surface is at least 20% and at most 50% of a mean wall thickness of the sleeve portion.

5. The spindle nut as claimed in claim 4, wherein the mean wall thickness is less than a quarter of a radius of the sleeve portion.

6. A screw drive comprising a spindle nut as claimed in claim 4 and a threaded spindle cooperating with this spindle nut.

7. The screw drive as claimed in claim 6, wherein it is a non-returning ball screw drive.

8. The screw drive as claimed in claim 6, wherein it is a ball screw drive with a single or external recirculation system.

\* \* \* \* \*